July 17, 1934.　　　　W. S. WERNER　　　　1,967,108
VOLTAGE REGULATING APPARATUS
Original Filed July 12, 1928
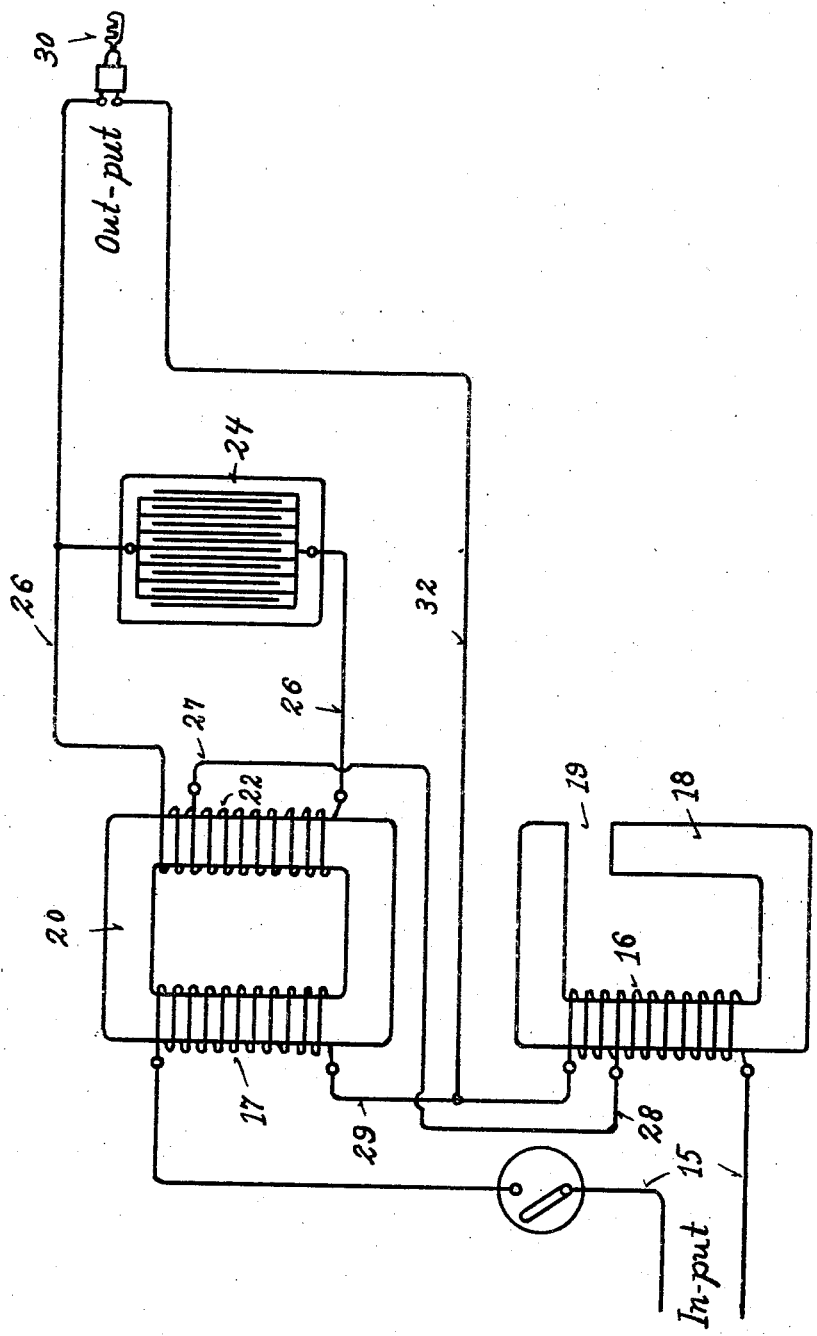
INVENTOR.
Wilbur S. Werner,
BY
C. W. Miles,
ATTORNEY.

Patented July 17, 1934

1,967,108

UNITED STATES PATENT OFFICE 1,967,108

VOLTAGE REGULATING APPARATUS

Wilbur S. Werner, South Fort Mitchell, Ky., assignor to The Kelley-Koett Manufacturing Company, Covington, Ky., a corporation of Ohio Application July 12, 1928, Serial No. 292,188
Renewed August 4, 1930

1 Claim. (Cl. 171—119)

My invention relates to improvements in electrical apparatus. One of its objects is to provide means to produce from a variable source of alternating current a secondary current of substantially uniform voltage. Another object is to provide electrical apparatus whereby from an alternating current primary in which the energy supplied is not uniform, a secondary current of uniform voltage may be produced. Another object is to provide electrical apparatus whereby a secondary current either of higher or of lower voltage and of substantially uniform voltage may be delivered employing a primary circuit in which the voltage supplied is not uniform. Another object is to provide improved electrical apparatus in which a secondary current of substantially a prescribed value may be produced using a primary circuit in which the voltage supplied is not of uniform value. My invention also comprises certain details of form and arrangement and combination of components, all of which will be fully set forth in the description of the accompanying drawing, in which:

The single figure is a diagrammatic view of electrical apparatus embodying my improvements.

Ordinarily where the voltage impressed upon or supplied to the primary of an electrical transformer is unsteady or variable, the energy developed in the secondary circuit follows in ratio the variations impressed upon the primary thereof, that is the same variation, or fluctuation appears in the secondary that was impressed upon the primary thereof, and results in a fluctuation from time to time in the voltage delivered by the secondary. I have discovered and perfected electrical means whereby the secondary and primary circuits may be so interengaged and inter-related as to cause variations in the voltage of the primary circuit to automatically regulate and control the current flowing in the secondary circuit so as to provide a secondary circuit of substantially uniform voltage, using voltage in the primary circuit which varies or fluctuates over a relatively wide range of values. Also where it is desired the apparatus may be so designed and proportioned that whenever a normally uniform primary voltage temporarily falls considerably below normal, the secondary is automatically regulated to hold its normal and uniform value, or where required provision may be made to automatically regulate and hold the secondary voltage at normal value even though the primary voltage may temporarily greatly exceed its normal and regular value.

In the accompanying drawing I have illustrated diagrammatically one modification of my improved apparatus in which 15 represents a primary circuit in which is included a choke coil, or inductive reactance 16, and a primary coil 17. The winding 16 is wound upon and insulated from an open magnetic core 18 that is a magnetic core having an air gap 19, or electrical equivalent therefor. The winding 17 is wound upon a closed core of magnetic material 20 and insulated therefrom. A secondary winding 22 is also wound upon the magnetic core 20, and the secondary winding 22 is included together with a condenser 24 in a secondary circuit 26, substantially as shown in the drawing. One branch of the secondary circuit 26 is connected through taps 27 and 28 brought out from the winding 16, with a portion of said winding 16, which thus causes a portion of the winding 16 to become also included as a portion of the secondary circuit, or inter-related to the secondary circuit.

Assume that alternating current ranging in voltage anywhere from sixty volts to one hundred and sixty volts be supplied from a line through the primary circuit. This source of energy may be either fluctuating within the range above specified, as for instance where traction cars or other variable load is carried upon the line, or the supply may be intermittently varied by changing from one line to another line of a different voltage, as for instance from a standard line of one hundred and ten volts to another standard line of sixty volts or to a standard line of one hundred and sixty volts, under any of the above conditions of supply to the primary circuit, when the windings 16, 17, 22 and the condenser 24 are properly proportioned, a secondary current of substantially uniform and unvarying voltage, for instance one hundred and ten volts and two amperes, will be delivered by the secondary circuit through an incandescent lamp or similar current consuming member 30, where it may be of considerable importance that a prescribed voltage should not be exceeded, as for instance in the cathode terminal of a Coolidge X-ray tube.

My proportioning the various windings and components shown in the drawing differently any desired voltage across the terminals of the secondary circuit may be obtained and self regulated to uniformly maintain the prescribed voltage in the secondary circuit, as for instance, any desired voltage in the secondary covering a range from five volts to two or three hundred volts, or greater, using a primary ranging from sixty to one hundred and sixty volts.

Assuming that the primary current was a standard sixty cycle current the secondary current would also be of sixty cycles. In practice the voltage phase in the primary is caused to vary in the winding 16, as compared with the voltage phase in the winding 17 due to one being wound upon a closed magnetic core while the other is wound upon an open gap magnet core. The voltage of the secondary winding 22 is out of phase with that of the primary winding 17. The voltage in the primary circuit is opposed to the voltage in the secondary circuit. One action of the condenser is to hold the current flowing in the secondary circuit in step with the primary current flowing in the winding 16, and thereby to cause any increase in the primary voltage to check or partially reduce the flow in the secondary, and any reduction in the primary voltage to step up the secondary voltage so as to partially increase the secondary flow, and thereby when properly proportioned to so compensate in the secondary for either an increase or decrease in the primary voltage as to uniformly deliver a current of uniform voltage in the secondary.

The apparatus illustrated is adapted to be proportioned to maintain the secondary voltage substantially uniform and constant while the primary voltage may fluctuate within limits either above or below its normal.

The apparatus is also adapted to be proportioned so that an increase in the line in-put tends to gradually reduce rather than increase the secondary voltage.

The apparatus is also adapted to be proportioned so that an increase in the line input tends to gradually increase the secondary voltage.

The apparatus herein shown and described is capable of considerable modification within the scope of the claim without departing from the spirit of my invention.

What I claim is:

Automatic electrical voltage regulating apparatus comprising a condenser, an open core, and a closed core, a primary alternating current circuit in which is included a primary winding on said closed core and a winding in series therewith upon said open core with a tap between said windings constituting one branch of the secondary circuit, and a secondary circuit branch in which is included a secondary winding upon said closed core connected in parallel with said condenser, and a conductor connected at one end to an intermediate tap on the primary winding on said open core and at its opposite end connected to an intermediate tap of the secondary winding on said closed core.

WILBUR S. WERNER.